US009436877B2

(12) United States Patent
Edmondson et al.

(10) Patent No.: US 9,436,877 B2
(45) Date of Patent: Sep. 6, 2016

(54) PEDESTRIAN RIGHT OF WAY MONITORING AND REPORTING SYSTEM AND METHOD

(71) Applicant: Polaris Sensor Technologies, Inc., Huntsville, AL (US)

(72) Inventors: Richard P. Edmondson, Huntsville, AL (US); Jonathan B. Hanks, Huntsville, AL (US)

(73) Assignee: Polaris Sensor Technologies, Inc., Huntsville, AL (US)

( * ) Notice: Subject to any disclaimer, the term of this patent is extended or adjusted under 35 U.S.C. 154(b) by 12 days.

(21) Appl. No.: 14/257,472

(22) Filed: Apr. 21, 2014

(65) Prior Publication Data

US 2014/0314275 A1   Oct. 23, 2014

Related U.S. Application Data

(60) Provisional application No. 61/813,783, filed on Apr. 19, 2013.

(51) Int. Cl.
  *G06K 9/00* (2006.01)
(52) U.S. Cl.
  CPC ....... *G06K 9/00771* (2013.01); *G06K 9/00785* (2013.01)
(58) Field of Classification Search
  USPC ........................................................ 382/103
  See application file for complete search history.

(56) References Cited

U.S. PATENT DOCUMENTS

| 5,734,339 | A | 3/1998 | Ogle |
| 6,100,819 | A | 8/2000 | White |
| 6,223,125 | B1 | 4/2001 | Hall |
| 6,573,929 | B1 * | 6/2003 | Glier ...................... G07B 15/06 340/933 |
| 6,754,663 | B1 * | 6/2004 | Small ..................... G07B 15/06 |
| 6,781,523 | B2 | 8/2004 | Matsui et al. |
| 6,894,717 | B2 | 5/2005 | Bakewell |
| RE38,870 | E | 11/2005 | Hall |

(Continued)

FOREIGN PATENT DOCUMENTS

| CN | 102253391 | 11/2011 | |
| CN | 104183126 A | * 12/2014 | ............. G08G 1/005 |
| EP | 2 063 404 A1 | 5/2009 | |

OTHER PUBLICATIONS

Mike Schagrin et al., "In-vehicle intersection violation Warning system," first published in ITS International, Mar. Apr. 2010, found at http://www.itsinternational.com/sections/nafta/features/in-vehicle-intersection-viciation-warning-system.

(Continued)

*Primary Examiner* — Gregory F Cunningham
(74) *Attorney, Agent, or Firm* — Angela Holt; Bradley Arant Boult Cummings LLP

(57) ABSTRACT

A system and method for monitoring vehicle traffic and collecting data indicative of pedestrian right of way violations by vehicles is provided. The system comprises memory and logic for monitoring traffic intersections and recording evidence indicating that vehicles have violated pedestrian right of way. Two sensor modalities collecting video data and radar data of the intersection under observation are employed in one embodiment of the system. The violation evidence can be accessed remotely by a traffic official for issuing of traffic citations.

10 Claims, 17 Drawing Sheets

(4 of 17 Drawing Sheet(s) Filed in Color)

(56) References Cited

U.S. PATENT DOCUMENTS

| | | | |
|---|---|---|---|
| 6,970,102 | B2 | 11/2005 | Ciolli |
| 6,970,103 | B2 | 11/2005 | Bortolotto |
| 7,327,282 | B2 | 2/2008 | Crocker et al. |
| 7,348,895 | B2 | 3/2008 | Lagassey |
| 7,616,293 | B2 | 11/2009 | Sirota et al. |
| 7,982,634 | B2 | 7/2011 | Arrighetti |
| 7,986,339 | B2 | 7/2011 | Higgins |
| 8,049,658 | B1* | 11/2011 | Lagonik ............... G01C 21/005 342/118 |
| 8,344,864 | B1 | 1/2013 | Al-Mutawa |
| 2002/0198632 | A1* | 12/2002 | Breed ................... B60N 2/2863 701/1 |
| 2003/0016143 | A1* | 1/2003 | Ghazarian .............. G08G 1/017 340/901 |
| 2003/0191577 | A1 | 10/2003 | Decaux |
| 2004/0051651 | A1* | 3/2004 | Carter ................... G08G 1/095 340/907 |
| 2005/0242306 | A1* | 11/2005 | Sirota .................... G08G 1/052 250/559.38 |
| 2006/0181433 | A1* | 8/2006 | Wolterman ............ G08G 1/164 340/917 |
| 2006/0287807 | A1 | 12/2006 | Teffer |
| 2007/0024494 | A1* | 2/2007 | Dizaji .................... G01S 7/412 342/90 |
| 2007/0074266 | A1* | 3/2007 | Raveendran ........... H04N 5/144 725/135 |
| 2009/0256911 | A1 | 10/2009 | Hakki et al. |
| 2010/0102991 | A1 | 4/2010 | Hernandez Gonzalez et al. |
| 2010/0268661 | A1* | 10/2010 | Levy ................... G06Q 30/0282 705/347 |
| 2013/0215273 | A1* | 8/2013 | Kareev .................. H04N 7/183 348/149 |
| 2014/0222323 | A1* | 8/2014 | Purushothaman . G06Q 30/0201 701/117 |

OTHER PUBLICATIONS

Dariu M. Gavrila, "Sensor-Based Pedestrian Protection," IEEE Intelligent Systems, Nov./Dec. 2001, pp. 77-81.

Guohui Zhang et al., "A Video-based Vehicle Detection and Classification System for Real-time Traffic Data Collection Using Uncalibrated Video Cameras," TRB 2007 Annual Meeting, Nov. 1, 2006, 17 pages.

Dana M. Beckwith et al., "Passive Pedestrian Detection at Unsignalized Crossings," Dec. 11, 1997, 26 pages.

Dana M Beckwith et al., "Passive Pedestrian Detection at Unsignalized Crossings," Transportation Research Record 1636, Paper No. 98-0725, pp. 96-103.

Yegor Malinovskiy et al., "Model-Free Video Detection and Tracking of Pedestrians and Bicyclists," Computer-Aided Civil and Infrastructure Engineering 24 (2009), c2008, pp. 157-168.

Pedro Mendes Jorge et al., "Automatic Tracking of Multiple Pedestrians with Group Formation and Occlusions," Instituto Superior de Engenharia de Lisboa. Lisboa, Portugal, 6 pages.

International Search Report and Written Opinion mailed Sep. 26, 2014 in corresponding International Application No. PCT/US14/34819 fild Apr. 21, 2014.

* cited by examiner

PEDESTRIAN RIGHT OF WAY MONITORING AND REPORTING SYSTEM AND METHOD

REFERENCE TO RELATED APPLICATIONS

This application claims priority to Provisional Patent Application U.S. Ser. No. 61/813,783, entitled "Automotive System for Enforcement and Safety" and filed on Apr. 19, 2013, which is fully incorporated herein by reference.

GOVERNMENT LICENSE RIGHTS

This invention was made with government support under Contract Number DTRT57-13-C-10004 awarded by the Department of Transportation, Federal Highway Administration. The government has certain rights in the invention.

BACKGROUND AND SUMMARY

A system and method for monitoring vehicle traffic and reporting pedestrian right of way violations by vehicles is provided. In one embodiment, the system combines two sensor modalities to monitor traffic intersections and track pedestrian movement and vehicle traffic. The system identifies vehicles that violate pedestrian right of way and records and reports evidence of violations by the vehicles. For example, the system determines when pedestrians are legally within a crosswalk and are endangered by a vehicle, or when a vehicle is illegally stopped within a crosswalk. Evidence will be collected in the form of a video segment of the vehicle, still imagery of the driver and the license plate, the date and time, and the location, for example.

A system according to an exemplary embodiment comprises memory and logic configured to receive and store in the memory radar and video data indicative of possible pedestrians and vehicles in an area under observation. The logic segments and classifies the radar and video data and stores in the memory tracked radar and video objects. The logic is further configured to receive and store in the memory traffic rules data indicative of traffic laws for the area under observation. The logic processes the tracked radar and video objects with the traffic rules data to generate and store in the memory data indicative of pedestrian right of way violations.

A method according to an exemplary embodiment of the present disclosure comprises receiving raw video data from a video camera and a radar device collecting an intersection of interest; processing the raw video data and radar data to form packetized video and radar data; segmenting the video data and radar data and classifying objects of interest; tracking the radar and video objects of interest; processing traffic rules, and generating rules violations.

DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
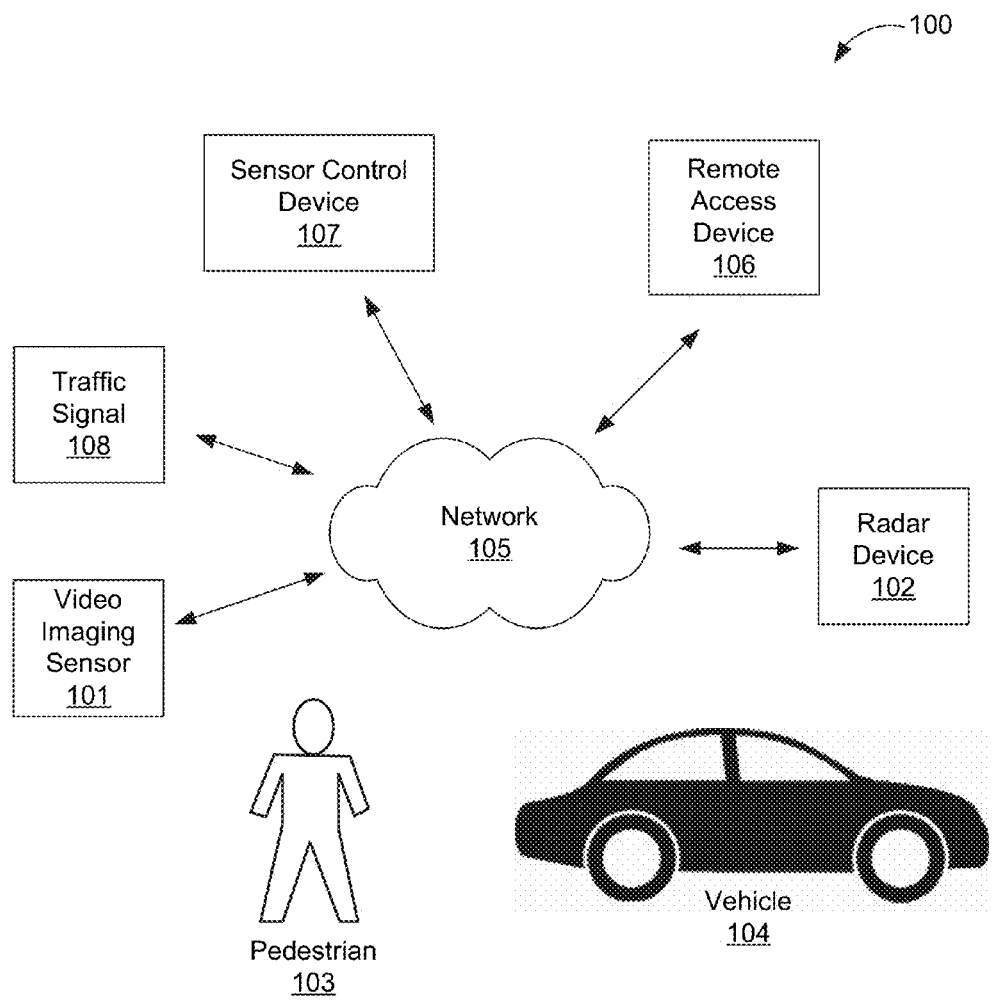
FIG. 1 is a block diagram illustrating a system in accordance with an exemplary embodiment of the present disclosure.

FIG. 1 illustrates a system 100 in accordance with an exemplary embodiment of the present disclosure. The system 100 comprises a video imaging sensor 101 and a radar device 102 which collect data, generally of a traffic intersection (not shown). One or more pedestrians 103 may be crossing a street (not shown) at the intersection and one or more vehicles 104 may be approaching the intersection. The system 100 collects radar and video data to track vehicles 104 and pedestrians 103 and determines when the vehicles 104 violate pedestrian right of way.

The video imaging sensor 101 comprises a video imaging device (not shown) such as a digital video camera that collects video images in its field of view. The video imaging sensor 101 further comprises a frame grabber (not shown) that packetizes video data and stores it, as further discussed herein with respect to FIG. 2.

The radar device 102 collects range, angle, and signal strength data reflected from objects in its field of view. The range, angle and signal strength data are packetized within the radar device 102. The radar device 102 is discussed further with respect to FIG. 3 herein.

The video imaging sensor 101 and the radar device 102 send packetized video data (not shown) and packetized radar data (not shown) to a sensor control device 107 over a network 105. The sensor control device 107 may be any suitable computer known in the art or future-developed. The sensor control device 107 may be located in a traffic box (not shown) at the intersection under observation by the system 100, or may be located remotely. The sensor control device 107 receives the packetized video data and radar data, segments the video data and radar data to classify objects of interest, tracks the objects of interest, and the processes rules to identify traffic violations. The sensor control device 107 is further discussed with respect to FIG. 4 herein.

In one embodiment, a user (not shown) accesses the sensor control device 107 via a remote access device 106. Access to the remote access device 106 may be made, for example, by logging into a website (not shown) hosted remotely, by logging in directly over a wireless interface, or by direct connection via a user console (not shown). In one embodiment the remote access device 106 is a personal computer. In other embodiments, the remote access device 106 is a personal digital assistant (PDA), computer tablet device, laptop, portable computer, cellular or mobile phone, or the like. The remote access device 106 may be a computer located at, for example, the local police office (not shown).

The network 105 may be of any type network or networks known in the art or future-developed, such as the internet backbone, Ethernet, Wifi, WiMax, broadband over power line, coaxial cable, and the like. The network 105 may be any combination of hardware, software, or both.

Figure 2:
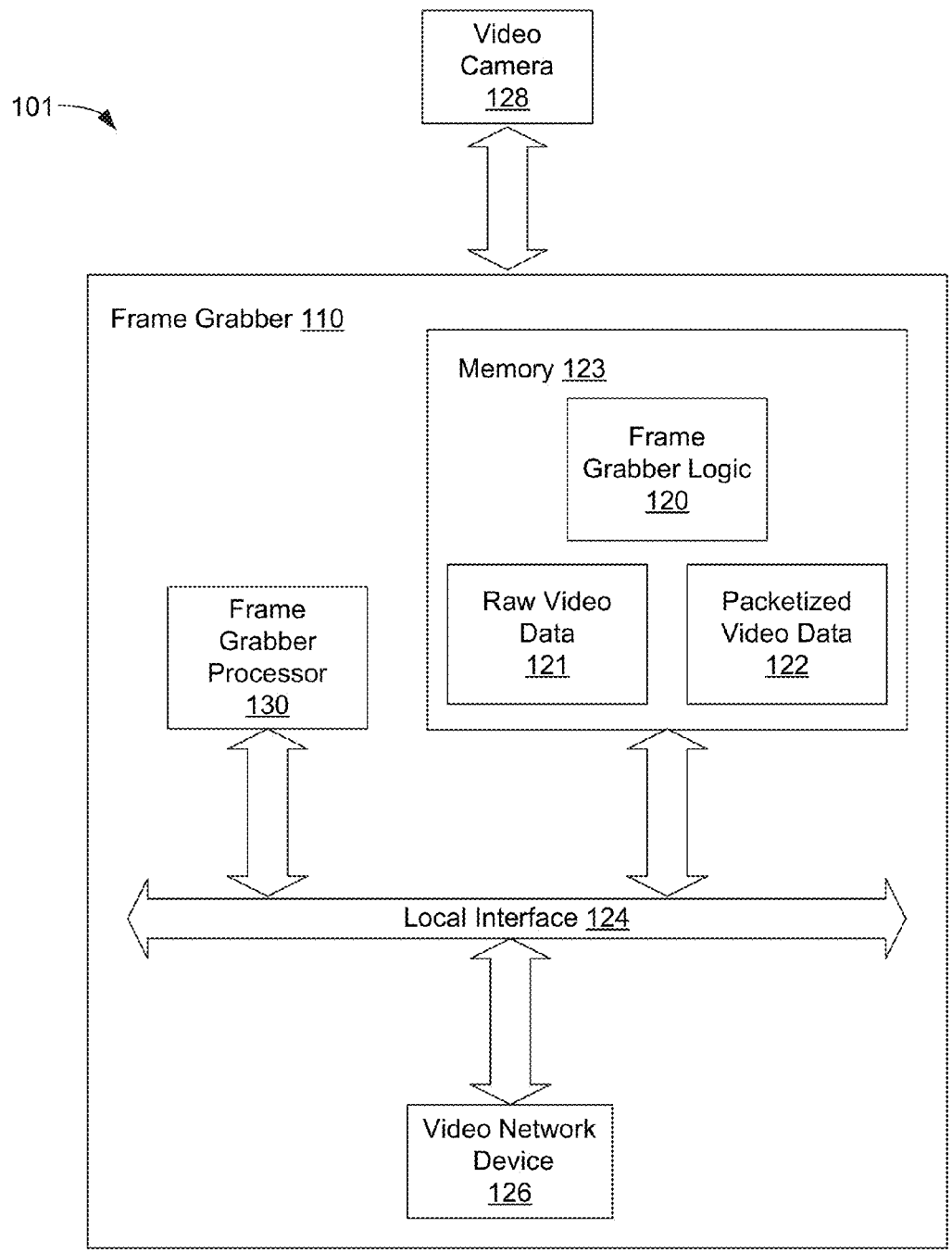
FIG. 2 is an exemplary video imaging sensor as depicted in FIG. 1.

FIG. 2 depicts an exemplary video imaging sensor 101 according to an embodiment of the present disclosure. The video imaging sensor 101 generally comprises a frame grabber 110 and a video camera 128.

The frame grabber 110 comprises frame grabber logic 120, raw video data 121, and packetized video data 122. In the exemplary video imaging sensor 101, frame grabber logic 120, raw video data 121 and packetized video data 122 are shown as stored in memory 123. The frame grabber logic 120, the raw video data 121, and the packetized video data 122 may be implemented in hardware, software, or a combination of hardware and software.

The frame grabber 110 captures raw video data 121 and packetizes it to form packetized video data 122. The packetized video data 122 is then sent to the sensor control device 107 (FIG. 1).

The frame grabber 110 also comprises a frame grabber processor 130, which comprises a digital processor or other type of circuitry configured to run the frame grabber logic 120 by processing and executing the instructions of the frame grabber logic 120. The frame grabber processor 130 communicates to and drives the other elements within the frame grabber 110 via a local interface 124, which can include one or more buses. A video network device 126, for example, a universal serial bus (USB) port or other type network device connects the frame grabber 110 with the network 105 (FIG. 1) for communication with other network devices, such as the sensor control device 107 (FIG. 1) and the remote access device 106 (FIG. 1).

When stored in memory 123, the frame grabber logic 120, the raw video data 121 and the packetized video data 122 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
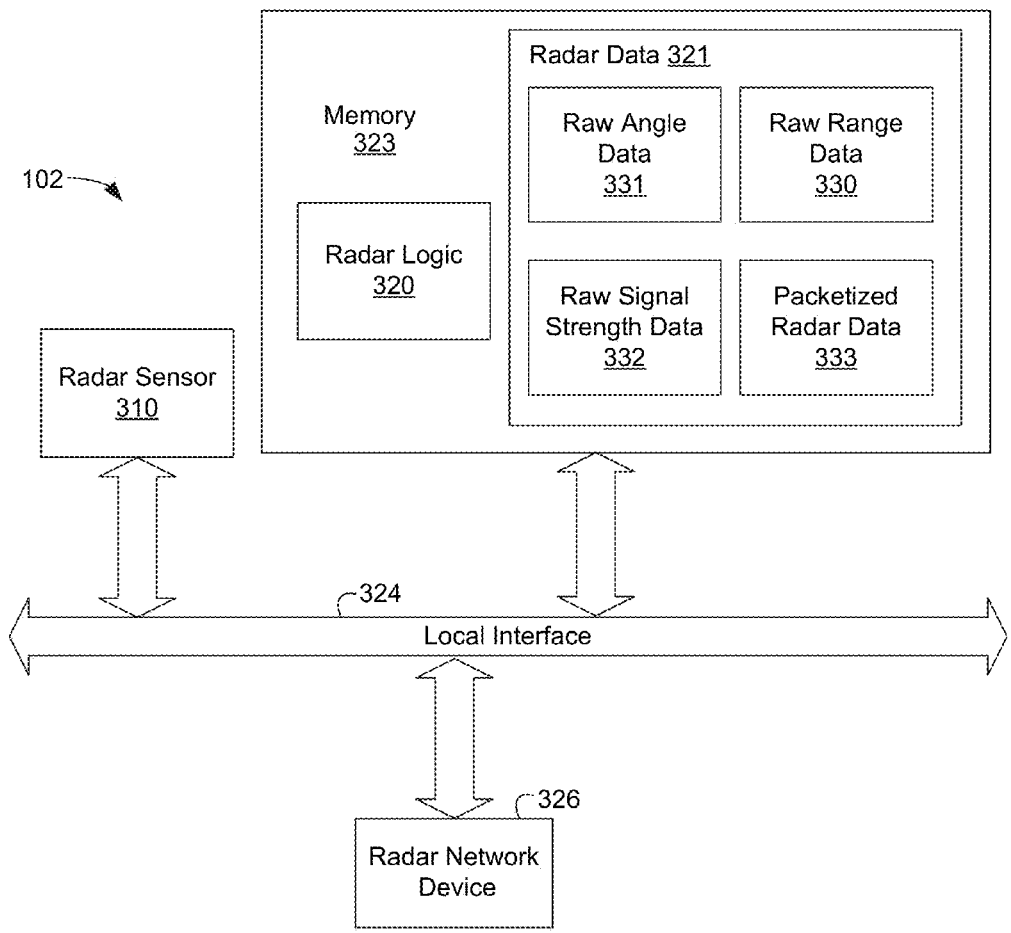
FIG. 3 is an exemplary radar device as depicted in FIG. 1.

FIG. 3 depicts a radar device 102 according to an embodiment of the present disclosure. The exemplary radar device 102 generally comprises a radar sensor 310 and a radar network device 326. The radar device 102 further comprises radar logic 320 and radar data 321, which can be software, hardware, or a combination thereof.

The radar sensor 310 comprises a radar transmitter and a receiver (not shown). The radar sensor 310 further comprises a digital processor or other type of circuitry configured to run the radar logic 320 by processing and executing the instructions of the radar logic 120. The radar sensor 310 communicates to and drives the other elements within the radar device 102 via a local interface 324, which can include one or more buses. A radar network device 326, for example, a universal serial bus (USB) port or other type network device connects the radar device 102 with the network 105 (FIG. 1) for communication with other network devices, such as the sensor control device 107 (FIG. 1) and the remote access device 106 (FIG. 1).

When stored in memory 323, the radar logic 320 and the radar data 321 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. The radar data 321 comprises raw range data 330, raw angle data 331, and raw signal strength data 332. Raw range data 330 comprises raw data received from the radar sensor 310 indicating the distance an object under observation (not shown) is from the radar device 102. Raw angle data 331 comprises data indicating the angle between the radar device 102 and the object under observation. Raw signal strength data 332 comprises data indicating the strength of the signal received from the object under observation.

The radar logic 320 executes the process of receiving the raw range data 330, raw angle data 331, and raw signal strength data 332 and packetizing it to form packetized radar data 333. The packetized radar data 333 is sent to the sensor control device 107, as further discussed herein.

Figure 4:
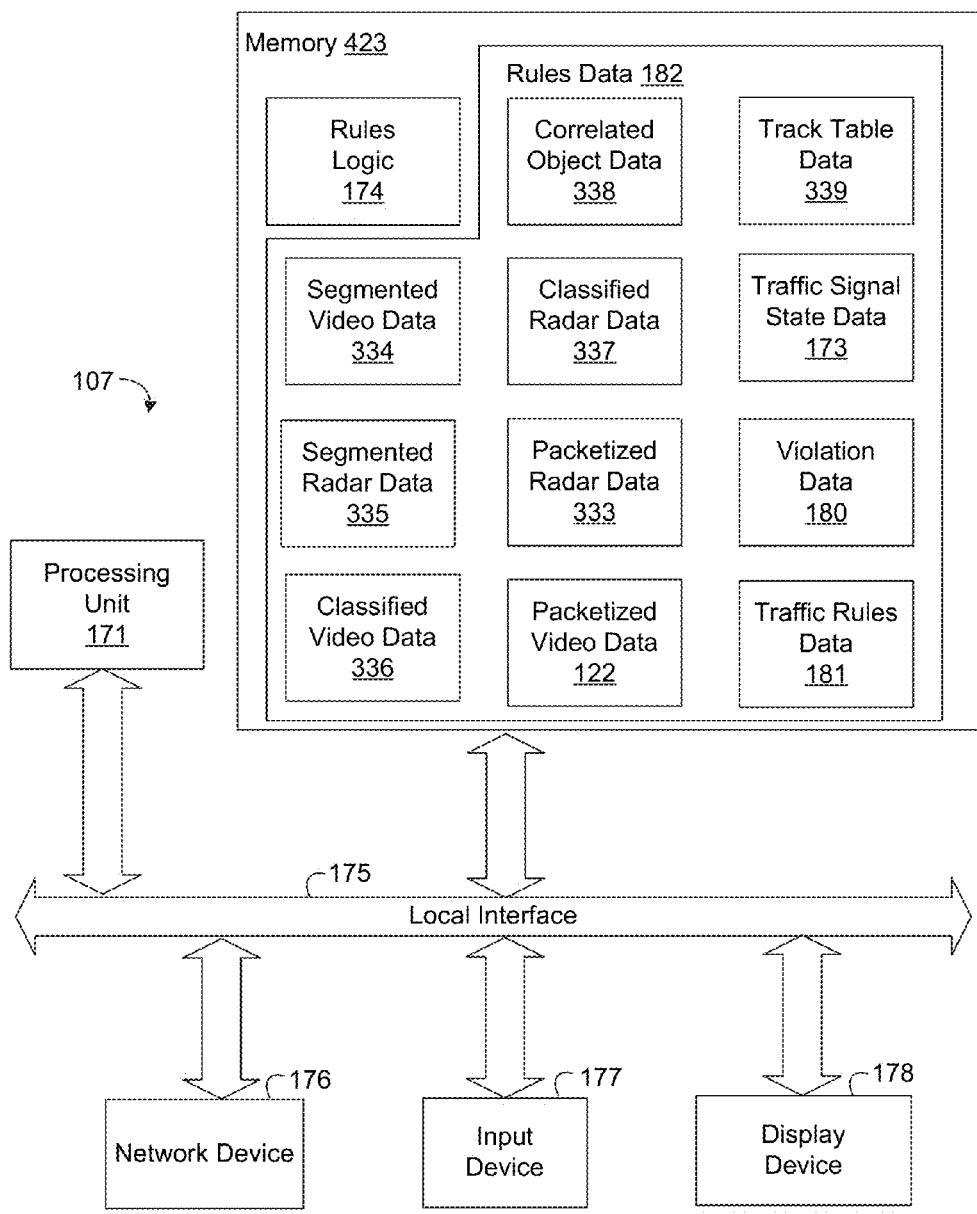
FIG. 4 is an exemplary sensor control device as depicted in FIG. 1.

FIG. 4 depicts a sensor control device 106 according to an embodiment of the present disclosure. The sensor control device 106 generally comprises a processing unit 171, a network device 176, an input device 177, and optionally a display device 178.

The sensor control device 106 further comprises rules logic 174 and rules data 182 which can be software, hardware, or a combination thereof. In the sensor control device 106, rules logic 174 and rules data 182 are shown as software stored in memory 423. However, the rules logic 174 and rules data 182 may be implemented in hardware, software, or a combination of hardware and software in other embodiments.

The processing unit 171 may be a digital processor or other type of circuitry configured to run the rules logic 174 by processing and executing the instructions of the rules logic 174. The processing unit 171 communicates to and drives the other elements within the sensor control device 106 via a local interface 175, which can include one or more buses. Furthermore, the input device 177, for example, a keyboard, a switch, a mouse, and/or other type of interface, can be used to input data from a user (not shown) of the sensor control device 106, and the display device 178 can be used to display data to the user. In addition, an network device 176, for example, a universal serial bus (USB) port or other type network device connects the sensor control device 106 with the network 105 (FIG. 1) for communication with other network devices, such as the radar device 102, video imaging sensor 101, the traffic signal 108, and the remote access device 106.

An exemplary input device 177 may include, but is not limited to, a keyboard device, switch, mouse, serial port, scanner, camera, microphone, or local access network connection. An exemplary display device 178 may include, but is not limited to, a video display.

Exemplary rules data 182 comprises packetized radar data 333 received from the radar device 102 and packetized video data 122 received from the video imaging sensor 101. Exemplary rules data 182 may further comprise segmented video data 334, segmented radar data 335, classified video object data 336, classified radar object data 337, correlated object data 338, and track table data 339.

The rules data 182 further comprises traffic signal state data 173 received from the traffic signal 108. In one embodiment, the traffic signal 108 directly communicates its current state to the sensor control device 107 in the form of traffic signal state data 173 which indicates whether the traffic signal 108 is red, yellow, or green, for example. Or for a pedestrian traffic signal, the signal state data 173 may be "Walk," "Don't Walk," or a flashing "Don't Walk." In another embodiment, the state of the traffic signal may be collected by the video imaging sensor 101, i.e., the video imaging sensor 101 can detect the color of the traffic light and report the state to the sensor control device 107. In still another embodiment, the intersection under observation does not have traffic signals at all (e.g., a four way stop). The system 100 therefore does not require input from traffic signals in order to monitor an intersection and report certain violations.

The traffic rules data 181 comprises traffic rules and parameters for the intersection under observation (not shown). Non-limiting examples of traffic rules data 181 may include:

a. Vehicle Traffic Rules and Parameters:
  i. Whether right turns are allowed on red;
  ii. Whether traffic is one way or two-way;
  iii. What constitutes a crosswalk obstruction, e.g., full obstruction or partial obstruction?
  iv. Is the area under observation an intersection, or a mid-block crosswalk?
  v. Is the traffic controlled by traffic signals? Pedestrian signals? Stop signs?
b. Pedestrian Rules and Parameters:
  i. Is a pedestrian allowed to cross on "Walk" indication only?
  ii. Does a pedestrian always have the right of way?
c. System Rules and Parameters:
  i. What is the proximity threshold (i.e., permitted distance between pedestrian and vehicle)?
  ii. Is a driver photo required as evidence of a violation?
  iii. Is a video of the vehicle's approach required as evidence of a violation?
  iv. Does the video of the violation need to be a certain length, or include certain objects, or angles, etc.?

The rules logic 174 executes the process of generating violation data 180 by processing the traffic signal state data 173, the packetized radar data 172, the packetized video data 183, and the traffic rules data 181. The violation data 180 can then be accessed by a user (not shown) via the remote access device 106.

The violation data 180 may include information such as a description of the violation, a description of the vehicle, a photo of the vehicle, a photo of the license plate of the vehicle, a video of the violation, and the like.

Figure 5:
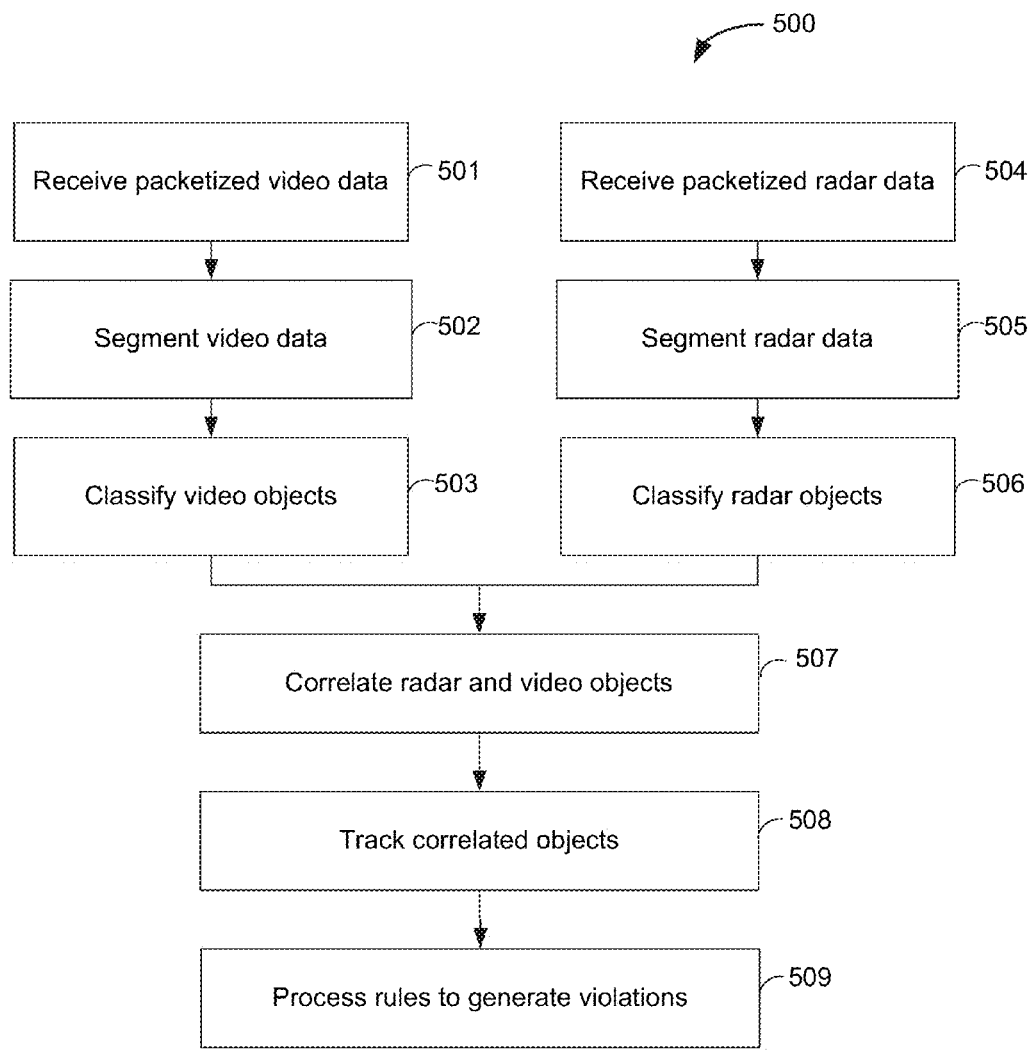
FIG. 5 is a flowchart depicting exemplary architecture and functionality of the rules logic in accordance with an exemplary embodiment of the disclosure.

FIG. 5 is a flowchart depicting exemplary architecture and functionality of the rules logic 174 (FIG. 4) in accordance with an exemplary embodiment of the disclosure. In step 501, the sensor control device 107 (FIG. 1) receives packetized video data 122 (FIG. 2) from the video imaging sensor 101 (FIG. 1).

In step 502, the sensor control device 107 segments the packetized video data 122 and creates segmented video data 334 (FIG. 4). In this segmentation step 502, objects that are not part of the background of an area under observation are segmented (i.e., subtracted from) from the background, and dynamic objects are observed. Any of a number of known segmentation algorithms may be used to perform this step. The segmented video data 334 may include data such as: the height and width (in pixels) of an object under observation; the average color of the object under observation; the row and column position of the object under observation, and the like. Each object under observation is assigned a unique identification number.

Figure 6:
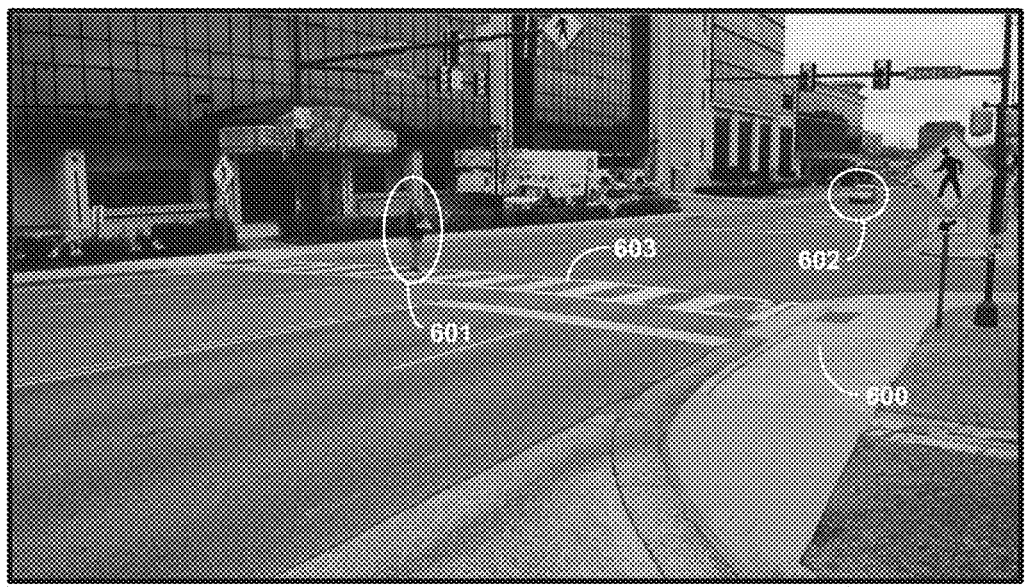
FIG. 6 is a video image of an intersection under observation with a pedestrian in a crosswalk crossing the street and a vehicle approaching the crosswalk.
Figure 7:
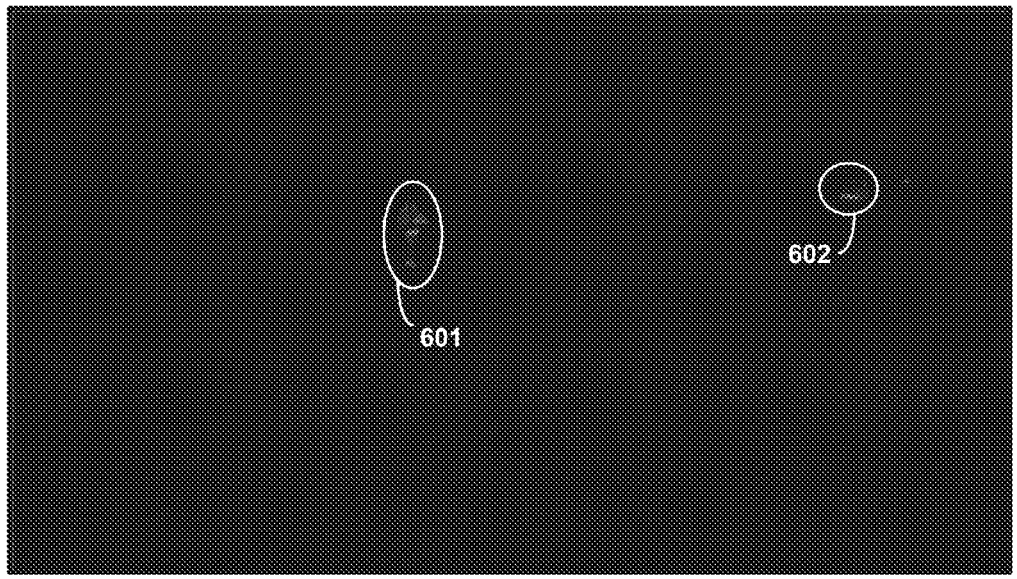
FIG. 7 is a segmented video image of the intersection of FIG. 6.

FIG. 6 illustrates an intersection under observation 600 with a "target" pedestrian 601 in a crosswalk 603 crossing the street and a target vehicle 602 approaching the crosswalk 602. FIG. 6 is an exemplary frame of video data 122 before the segmentation step 502 has been performed. FIG. 7 is an exemplary frame of segmented video data. The static background is black and the target pedestrian 601 and the target vehicle 602 show up as whitish "blobs."

Figure 8:
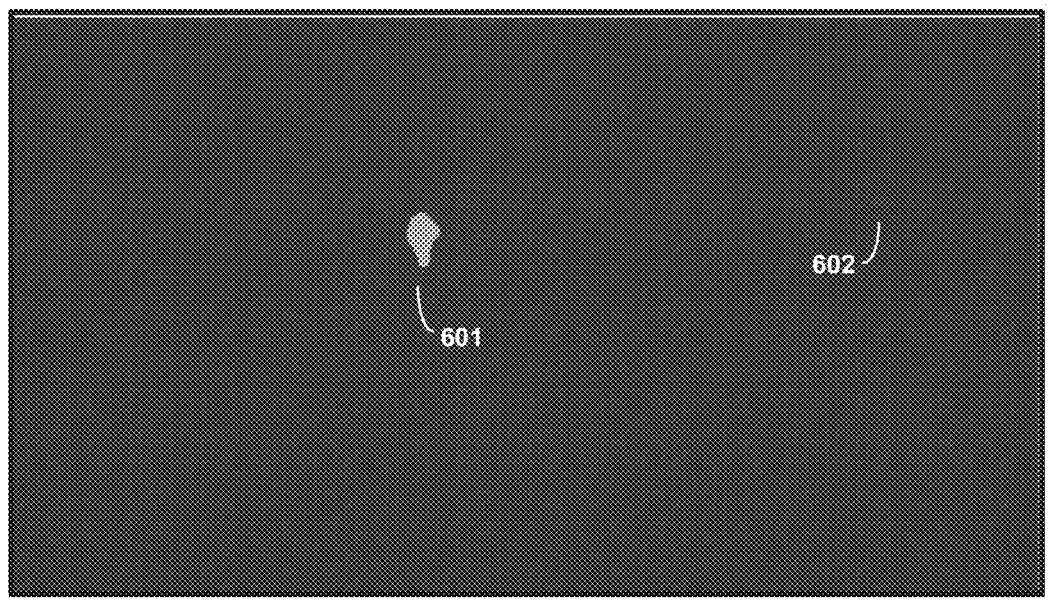
FIG. 8 is an image of the intersection of FIG. 7 following application of a blob finder program.
Figure 9:
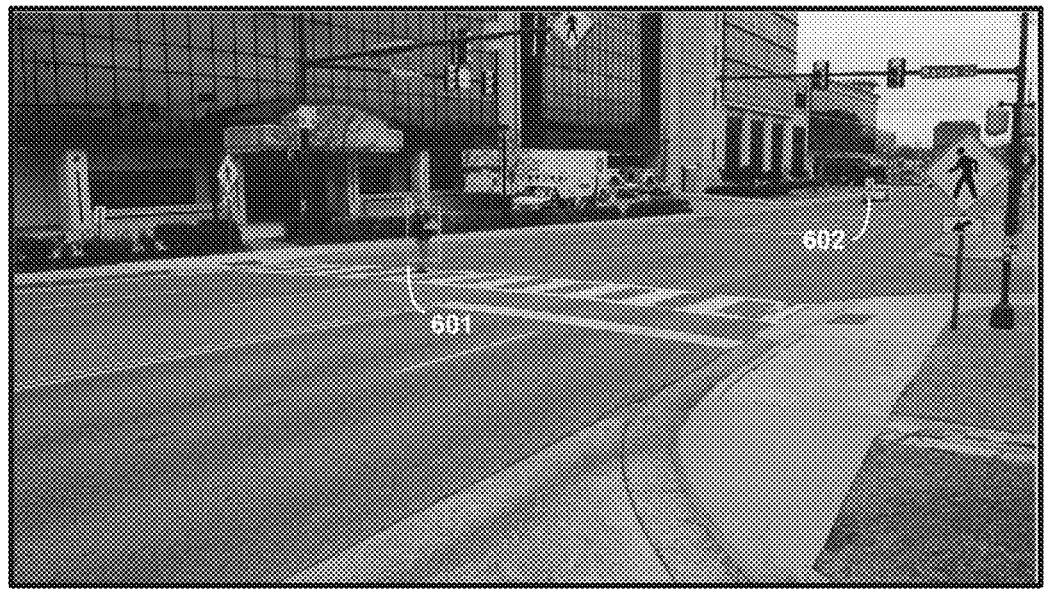
FIG. 9 is the video image of FIG. 6 showing a target pedestrian and a target vehicle with unique identification numbers assigned.

In FIG. 8, a "blob finder" program has been applied to the segmented video data frame. The blob finder program finds all of the pixels in proximity and groups them and illustrates the object in a specified color. At this point, the pedestrian 601 appears with more clarity as a light blue blob and the vehicle 602 appears as a red blob. FIG. 9 illustrates a video image of the intersection of FIGS. 6-8, with the unique identification numbers assigned in step 502 and a green tracking box surrounding the pedestrian 601 and vehicle 602.

Referring to FIG. 5, in step 503, the sensor control device 107 classifies the segmented video data 334. In this classification step 503, the sensor control device 107 analyzes the blobs from step 502 and decides what they are: e.g., whether they are pedestrians, vehicles, or unknown. The sensor control device thus classifies the segmented video data 334, resulting in classified video objects 336.

In parallel with steps 701-703, the frame grabber logic 120 in step 504 receives packetized radar data 333 (FIG. 3) from the radar device 102 (FIG. 1). In step 505, the packetized radar data 333 (illustrated in FIG. 10) is segmented in a similar manner as the segmentation of the video data in step 502 (and as further discussed herein with respect to FIG. 11), resulting in segmented radar data 335.

Figure 10:
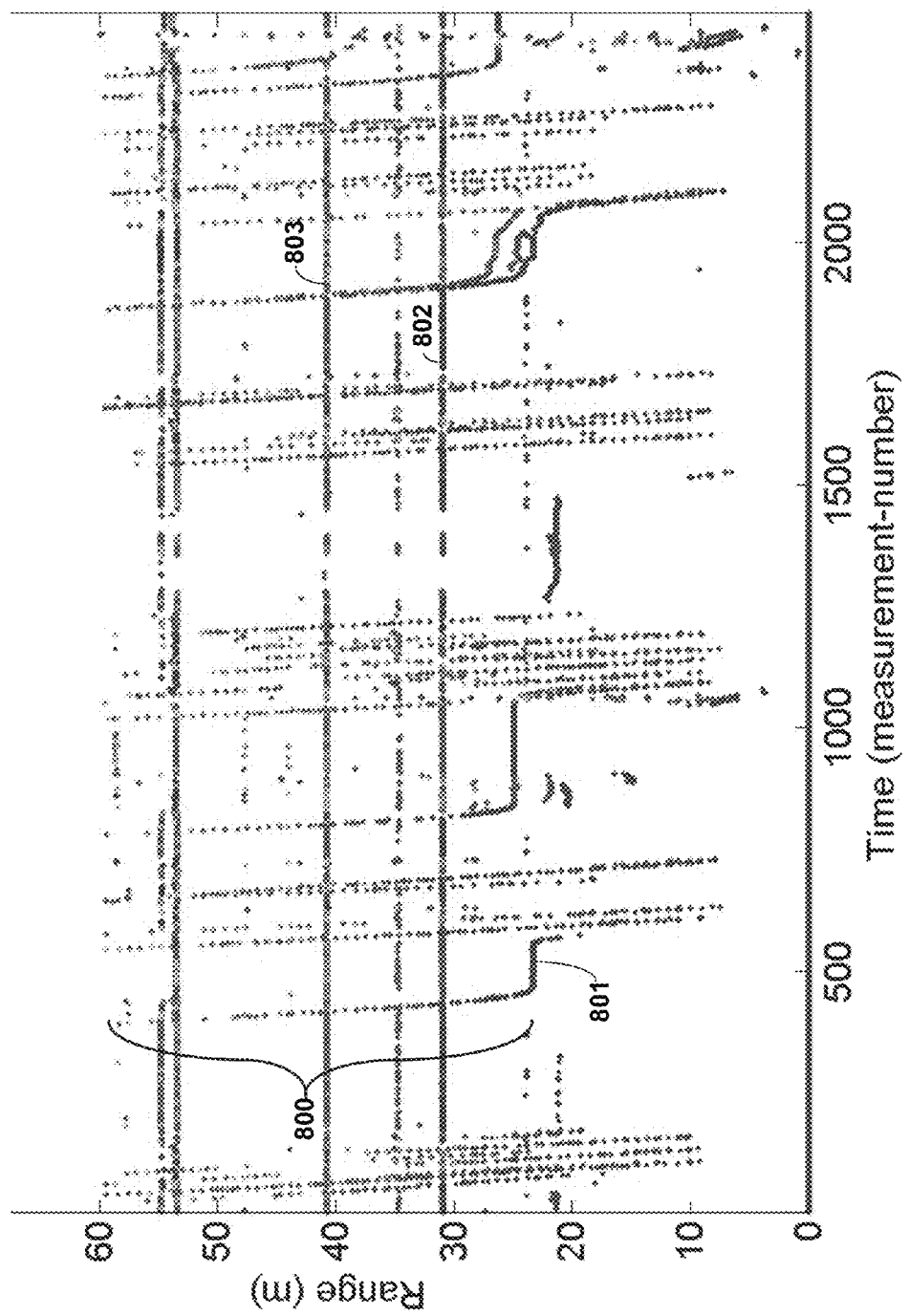
FIG. 10 is an exemplary illustration of packetized radar data collected in an intersection under observation.

FIG. 10 illustrates packetized radar data 333 received from the radar device 102 (FIG. 1) from an observation of traffic at an intersection over time. Approaching vehicles create tracks 800, i.e. lines of individual radar signals received over time. Where the tracks become horizontal (indicated by reference number 801), the vehicle has stopped, i.e., as in at a red light in the intersection. In the segmentation step 505, the radar data is decluttered, meaning that the background objects (e.g., the lines indicated by reference numbers 802 and 803) are identified and removed.

Figure 11:
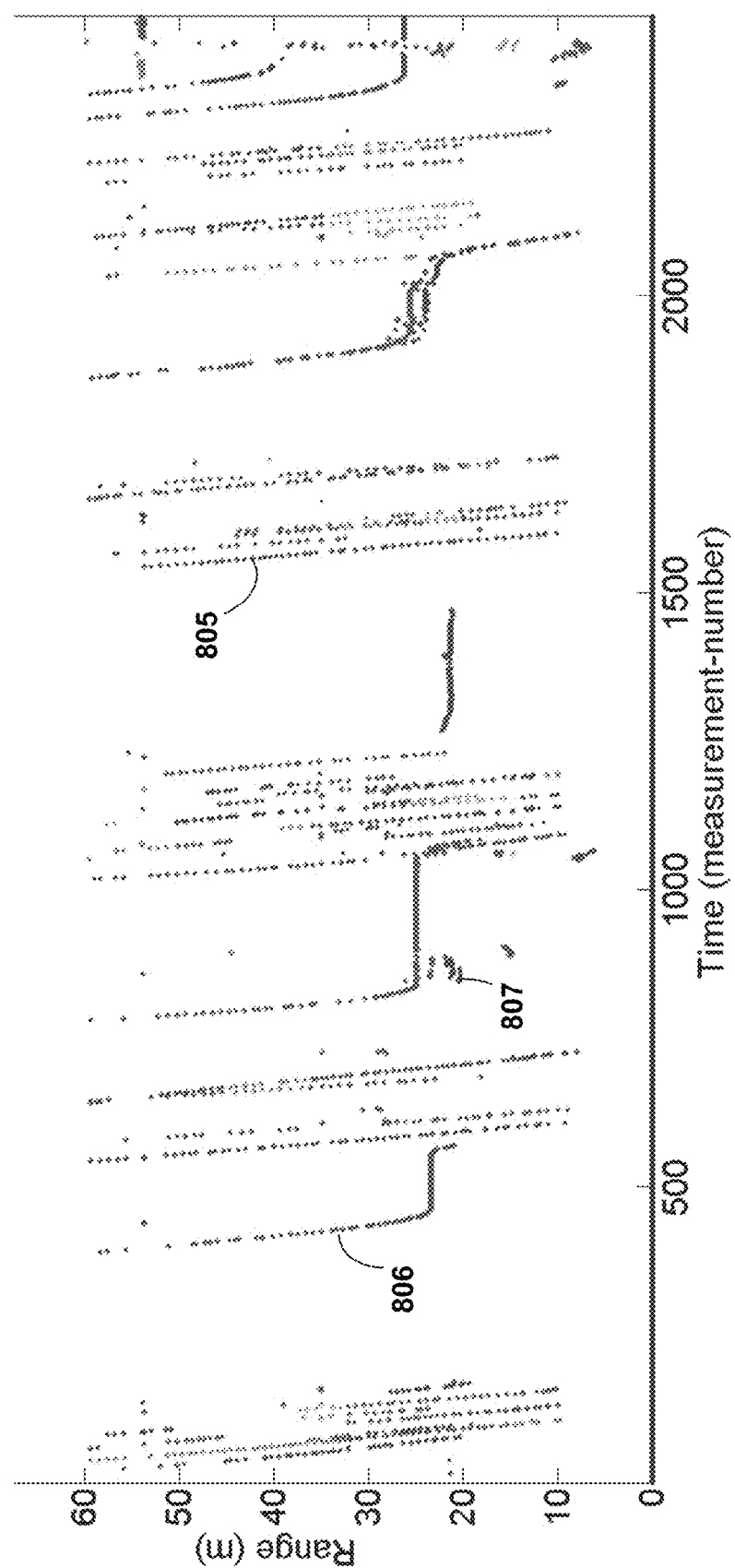
FIG. 11 is an exemplary illustration of the data from FIG. 10 after segmentation.

FIG. 11 illustrates segmented radar data 335 after the segmentation step 505 has been completed. Reference number 805 indicates a vehicle that has passed through the intersection without stopping. Reference number 806 indicates a vehicle that approached the intersection, stopped at a red light, and then passed on through the intersection. Reference number 807 indicates a pedestrian that has crossed through the intersection at the crosswalk.

In step 506, the radar objects under observation are classified in a similar manner as the classification of the video data in step 503. In this regard, from the segmented radar data 335, radar objects under observation are classified into vehicles or pedestrians or unknowns, and identification numbers are assigned to the objects, resulting in classified radar objects 337.

In step 507, the classified video objects 336 from step 503 and the classified radar objects 337 from step 506 are correlated. The goal of this correlation step 507 is to take the classified objects from each sensor modality and create a consolidated list of well defined objects (or correlated objects 338) to the tracker. The more information is known about each object, the better the results of the tracking step 508 will be. For example, from the classified video objects 336, the system can determine the color of a vehicle, the angle from the camera to the vehicle, the number of pixels the vehicle fills in the camera view, and the like, at an instant in time. From the classified radar objects 337, the system can determine the range, speed, and angle of the vehicle, at an instant in time. By monitoring multiple frames of video and radar, the system can compute a velocity for the vehicle and rate of change of the vehicle speed.

In the correlation step 507, like parameters for radar and video objects are compared and correlated. For example, a blue car observed at an angle of −4 degrees via the video data can be correlated with a vehicle seen at −4 degrees via the radar data, and a correlated object 338 is recorded for tracking. A confidence level is assigned to each correlated object 338 based upon the likelihood of correlation of the two modalities based upon the observed parameters. For example, where a classified object has the same angle value and range value and speed value as a radar-observed object, a high degree of confidence would be assigned. However, if for one or more of the observed parameters, the video data shows something the radar data does not, such that the objects are not well correlated, the confidence value would be lower. The correlation step 507 is further discussed herein with respect to FIG. 12.

In step 508, the correlated objects 338 are tracked. In this step, a tracking algorithm that is known in the art filters the objects to identify vehicles and pedestrians in the area under observation. Any of a number of known tracking algorithms may be used for the tracking step 508, such as a particle filtering or Kalman filtering. An exemplary tracking step 508 is further discussed herein with respect to FIG. 13.

In step 509, the rules logic 174 (FIG. 4) executes the process of generating violation data 180 (FIG. 4) by applying the traffic rules to the movement of the vehicles and pedestrians. By way of example, if vehicles are supposed to stop at a crosswalk when pedestrians are present, and one of these vehicles is tracked passing into the crosswalk (i.e., not stopping) when a pedestrian is present, a violation has occurred. The violation data 180 generated includes the traffic violation that occurred, time and date data of the violation, and photographs of the vehicle that had the violation, and a video of the violation. A traffic official can access the violation data 180 via the remote access device 106 and has all of the evidence needed to report the violation and issue a citation.

Figure 12:
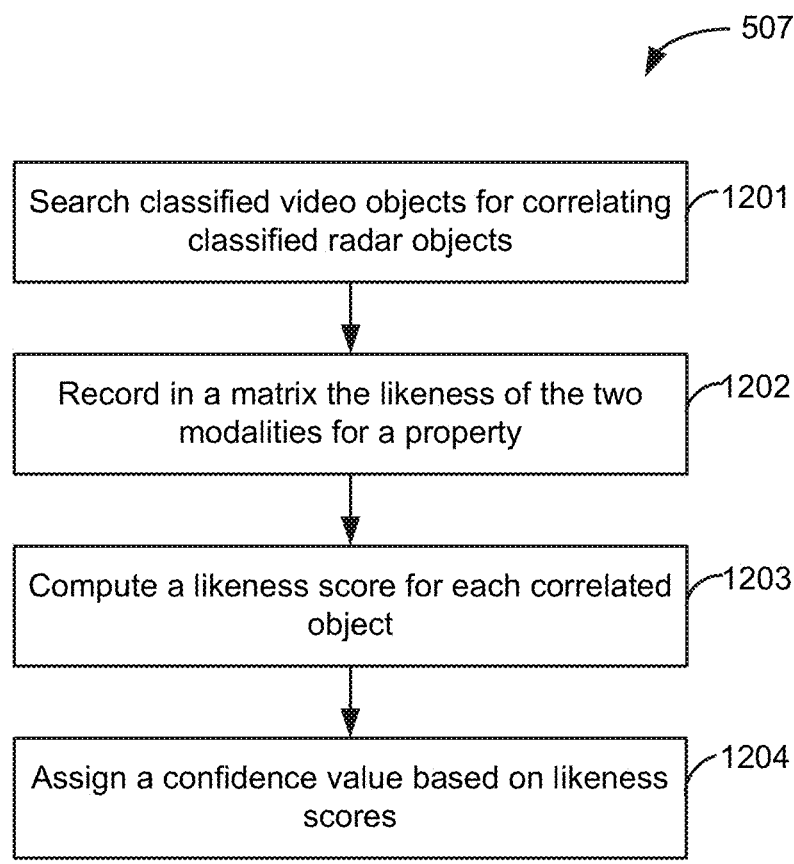
FIG. 12 is a flowchart depicting exemplary architecture and functionality of the correlation step in accordance with an exemplary embodiment of the disclosure.

FIG. 12 is a flowchart depicting exemplary architecture and functionality of the correlation step 507 (FIG. 5) in accordance with an exemplary embodiment of the disclosure. In step 1201, the rules logic 174 (FIG. 4) searches classified video objects 336 for correlating classified radar objects 337. In step 1202, for various properties of each modality, record in a matrix the "like" measurements. In one exemplary embodiment, the matrix may be an M×N×Z matrix where "M" is the number of objects in one modality (e.g., video), "N" is the number of objects in the alternate modality (e.g., radar), and "Z" is the number of related properties (e.g., angle, speed, etc.).

In step 1203, an overall "likeness" score is computed for each correlated object 338 in the two modalities. In the exemplary object discussed above with respect to step 1202, the computation uses the Z vector and the result will be an M×N matrix. In step 1204, a confidence value is assigned for each object based upon the likeness scores from step 1203.

Figure 13:
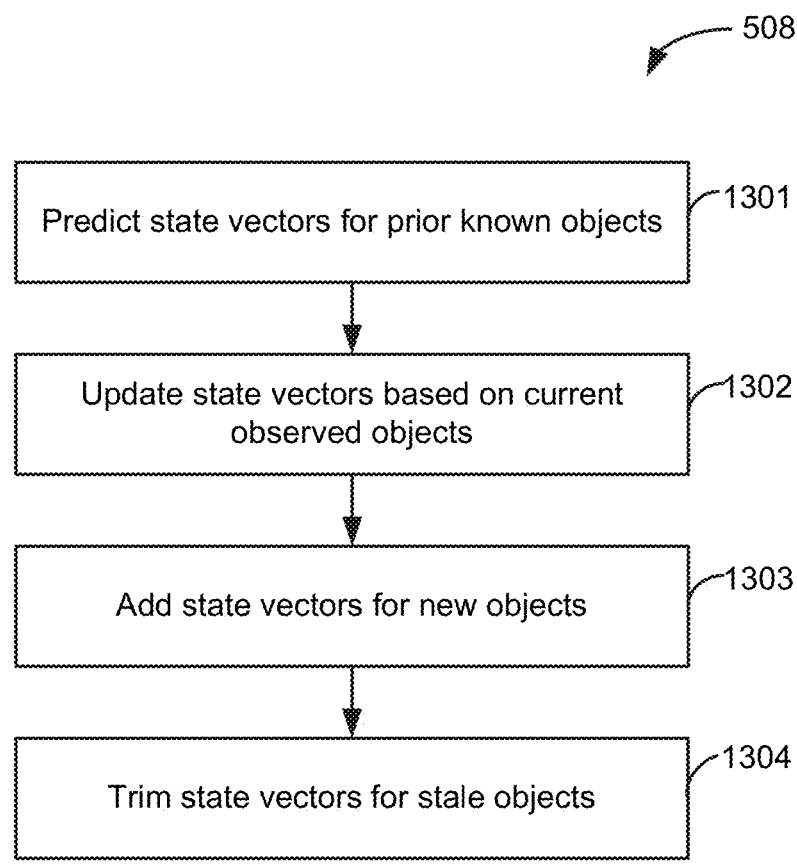
FIG. 13 is a flowchart depicting exemplary architecture and functionality of the tracking step in accordance with an exemplary embodiment of the disclosure.

FIG. 13 is a flowchart depicting exemplary architecture and functionality of the tracking step 508 (FIG. 5) in accordance with an exemplary embodiment of the disclosure. In step 1301, the rules logic 174 predicts state vectors for prior known correlated objects 338. In this step, the system uses past object data to predict current parameters of the object, and creates predicted state vectors. State vector data is recorded as track table data 339.

In step 1302, the state vectors from step 1301 are updated based upon current observed objects. In other words, this step determines how accurate the predicted state vectors were for the observed objects. In step 1303, state vectors are added for "new" objects. The new objects are objects that did not line up with state vector predictions, such that they may not be pedestrians or vehicles of interest.

In step 1304, the state vectors are trimmed, and "stale" objects are discarded. For example, if an object has not been seen in three or four sets of data over time, it is not a pedestrian or vehicle of interest and can be removed from the track list in the track table data 339.

The system 100 described herein with respect to FIG. 1-FIG. 12 generally describes a single radar device 102 and a single video imaging sensor 101 for the sake of simplicity. Obviously, however, an intersection under observation generally requires more than one radar device 102 and video imaging sensor 101, to observe all of the traffic lanes and record the necessary information for reporting violations, as is further discussed herein.

Figure 14:
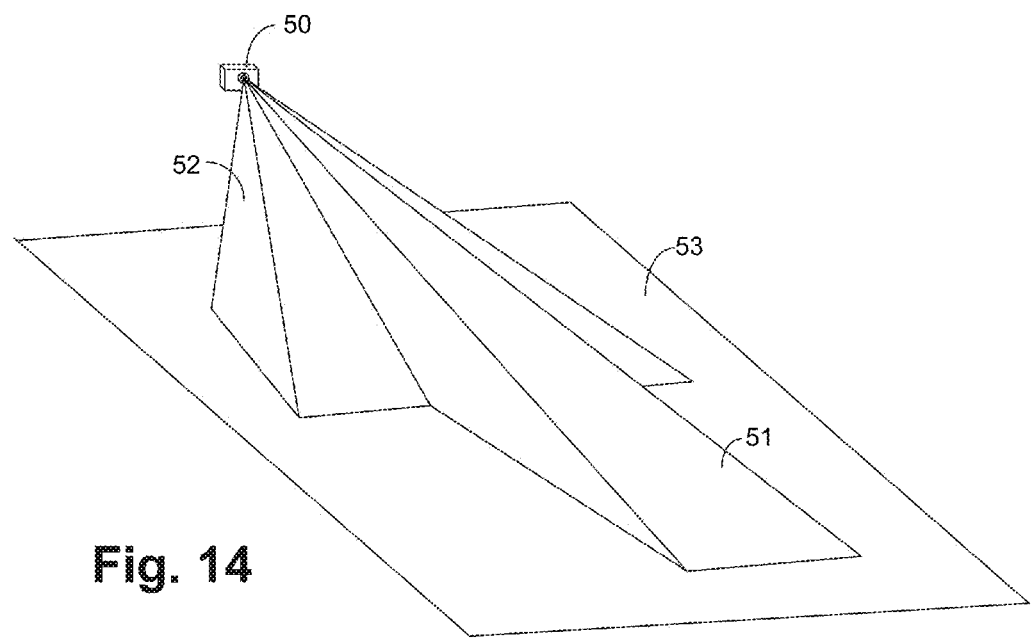
FIG. 14 illustrates coverage area on a surface area under observation of a combined video imaging sensor and radar device.

FIG. 14 illustrates coverage area on a surface area under observation 53 of a combined video imaging sensor 101 and radar device 102 (FIG. 1), which will be referred to as the "combined sensor" 50 with reference to FIGS. 14-24 herein. The combined sensor 50 provides a relative long radar coverage area 51 and a shorter, but wider, video coverage area 52. The radar coverage area 51 being longer provides input for tracking vehicles (not shown) from farther away, as the vehicles approach an intersection.

Figure 15:
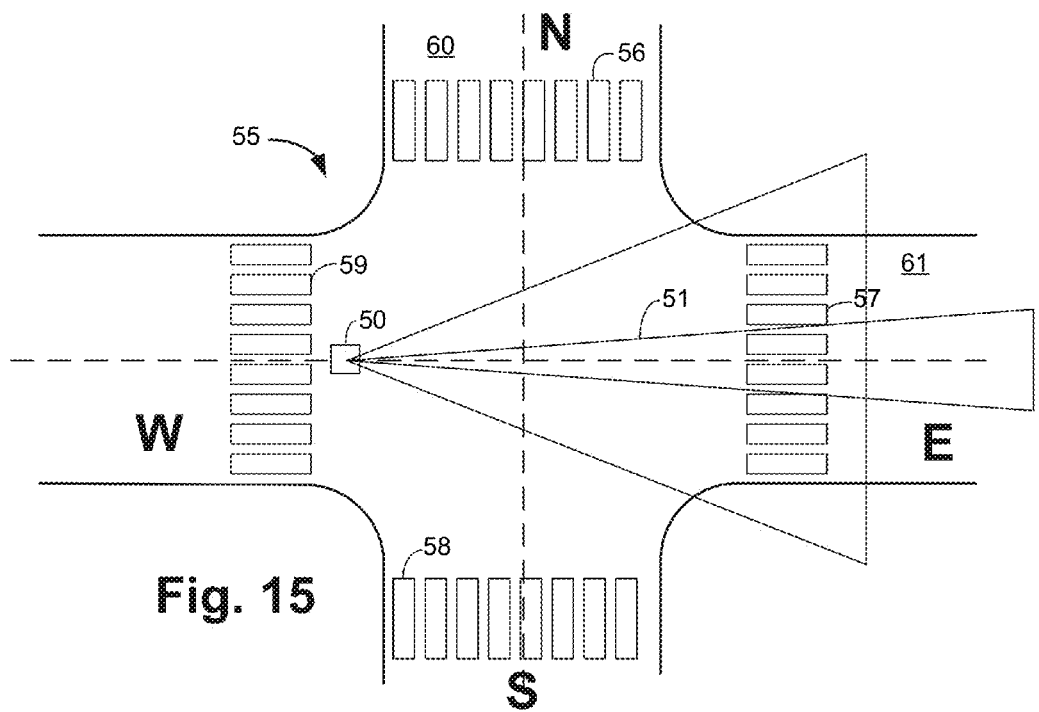
FIG. 15 is an overhead representation of the system of FIG. 1, and specifically of an intersection under observation by a combined sensor.

FIG. 15 is an overhead representation of the system 100 (FIG. 1), and specifically of an intersection 55 under observation by a combined sensor 50. The combined sensor 50 is typically mounted to an overhead pole or wire (not shown), such that the combined sensor 50 overlooks the intersection 55 from above.

The intersection 55 comprises a north-south street 60 intersecting with an east-west street 61. The intersection 55 further comprises four pedestrian crosswalks: a north crosswalk 56, an east crosswalk 57, a south crosswalk 58, and a west crosswalk 59. FIG. 15 is a simple representation showing one combined sensor 50 with a radar coverage area 51 and a video coverage area 52. It is understood, however, that for complete coverage of a four-street intersection, four (4) combined sensors 50, one facing in each of the four street directions, would generally be required, as further discussed herein. Further, it is understood that intersections of different configurations (e.g., Y intersections, five point intersections, mid-block crosswalks, and the like) would generally require a different number of combined sensors.

Figure 16:
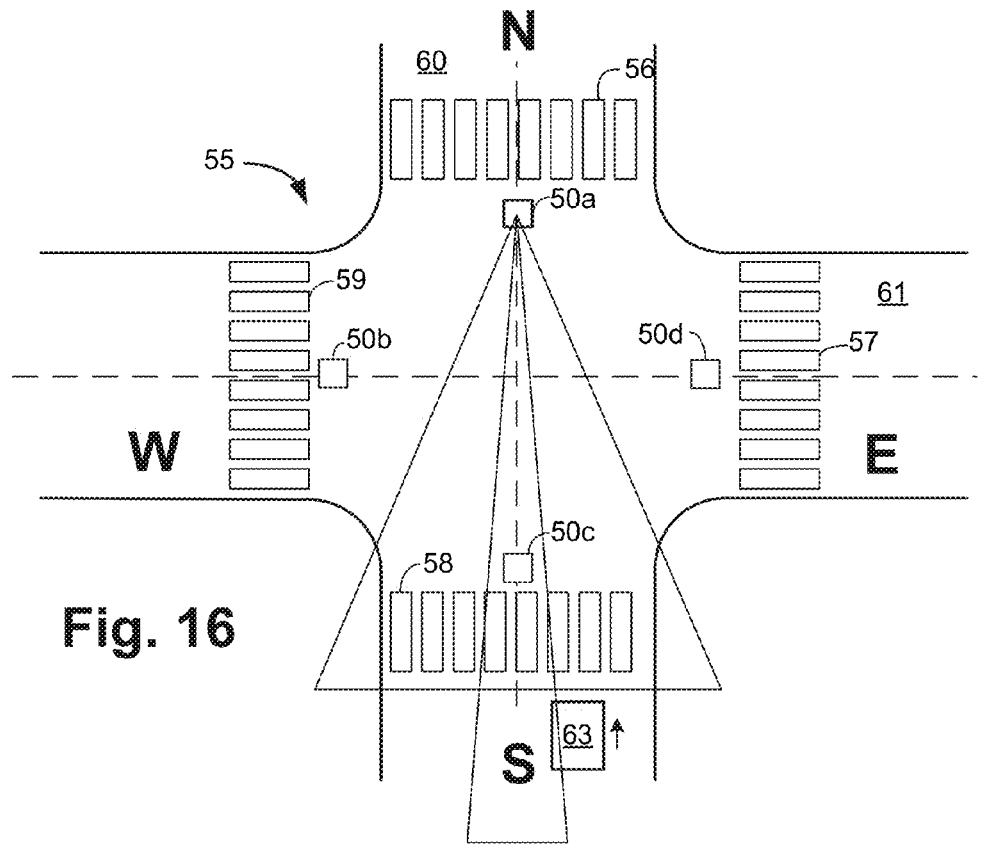
FIG. 16 depicts the system of FIG. 15 observing an intersection, with combined sensors mounted facing each of the four directions north, west, south, and east and a vehicle driving north toward the intersection.

FIG. 16 depicts the system 100 of FIG. 15 observing an intersection 55, with combined sensors 50a-50d mounted facing each of the four directions north, west, south, and east, respectively. In operation of the system 100, most pedestrian right of way violations fall into one of the following four broad categories based upon the traffic path of a vehicle 63:
  a. Normal through traffic;
  b. Left turn;
  c. Right turn;
  d. Right turn on red.

Each category of violation requires proper coordination between the combined sensors 50a-50d to properly track the intersection 55. The four categories of violations are discussed in Examples 1-4 below. Although input from the traffic signal 108 (FIG. 1) is not generally discussed in Examples 1-4 below, it is understood that traffic signal state data 173 (FIG. 4) may be collected and analyzed in any or all of the scenarios.

EXAMPLE 1

Normal Straight Through Traffic Scenario Example

Figure 17:
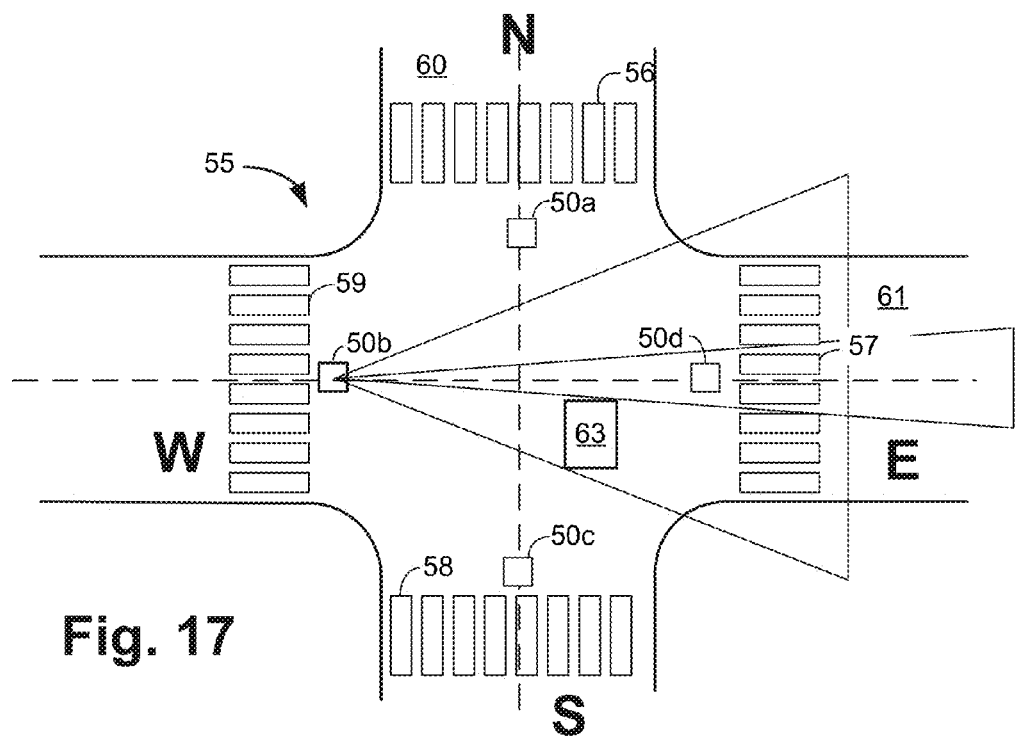
FIG. 17 illustrates the system of FIG. 16 as the vehicle passes through the intersection and is in range of the west combined sensor.
Figure 18:
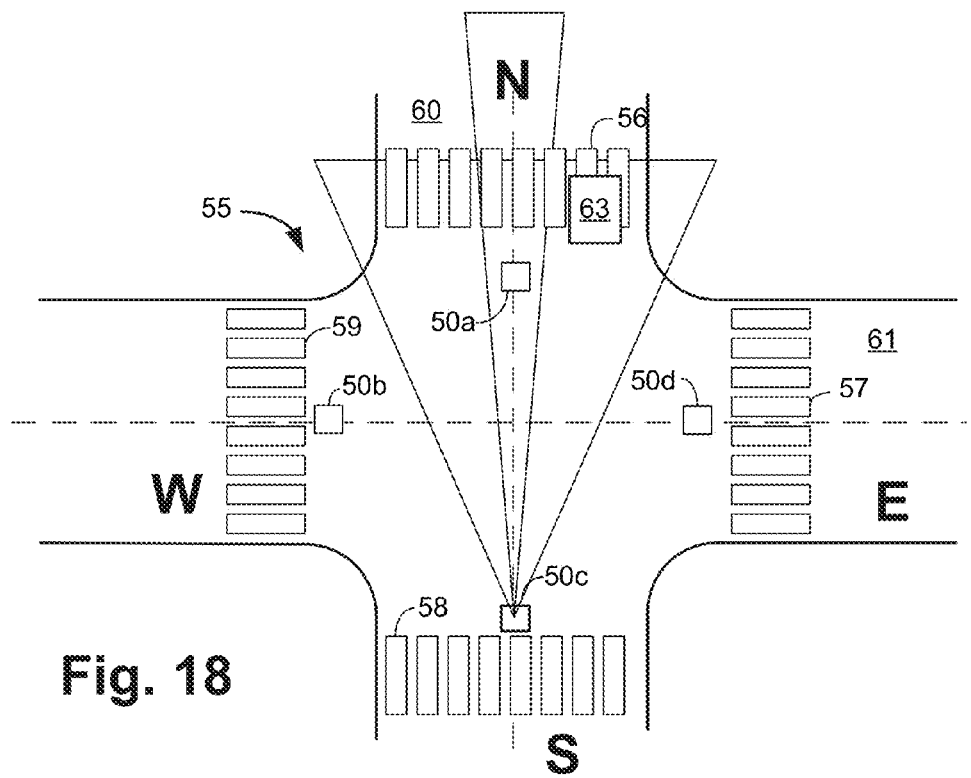
FIG. 18 illustrates the system of FIG. 16 as the vehicle continues driving north of the intersection.

FIGS. 16-18 illustrate an exemplary traffic scenario for a northbound vehicle 63 traveling straight through the intersection 55 (i.e., not turning right or left). In this scenario, examples of possible violations are:
  a. an illegal stop by the vehicle 63 within the north crosswalk 56; and
  b. an illegal stop within the south crosswalk 58.

In this scenario, unless stopped by a traffic signal (not shown), the vehicle 63 generally has the right of way to proceed north through the south crosswalk 58. Under normal circumstances there are no moving right of way violations that could occur where a pedestrian's safety is illegal endangered. However, if the vehicle 63 becomes stopped on either the north crosswalk. 56 or the south crosswalk 58 at the conclusion of a green light, then a violation has occurred that should be cited.

In the scenario illustrated in FIG. 16, the vehicle 63 is driving north on street 60, south of the intersection 55. The vehicle 63 is first detected by the radar device in the north combined sensor 50a, and then by the video imaging sensor in the north combined sensor 50a. The north combined sensor 50a collects and stores a sequence of video and radar frames of the approach of the vehicle 63.

FIG. 17 illustrates the vehicle 63 as it passes through the intersection 55 and is in range of the west combined sensor 50b. A still image of the driver (not shown) is collected by the west combined sensor 50b and stored as raw video data 121 (FIG. 2).

FIG. 18 illustrates the vehicle 63 as it continues driving north on street 60, north of the intersection 55. At this point, the vehicle 63 is in range of the south combined sensor 50c, which collects and stores a sequence of video frames of the vehicle 63 passing through the north crosswalk 56, and collects and stores a still image of the vehicle's license plate, as well as the date and time.

In the traffic sequence discussed above with respect to FIGS. 16-18, if the sensor control device 107 (FIG. 1) detects that the vehicle 63 stopped in a crosswalk 56, 57, or 59, then the data recorded of the vehicle 63 would be tagged as evidence and stored as violation data 180 (FIG. 4). However, if the sensor control device 107 detects that no violation has occurred, the data associated with vehicle 63 would be discarded.

EXAMPLE 2

Left Turn Scenario Example

Figure 19:
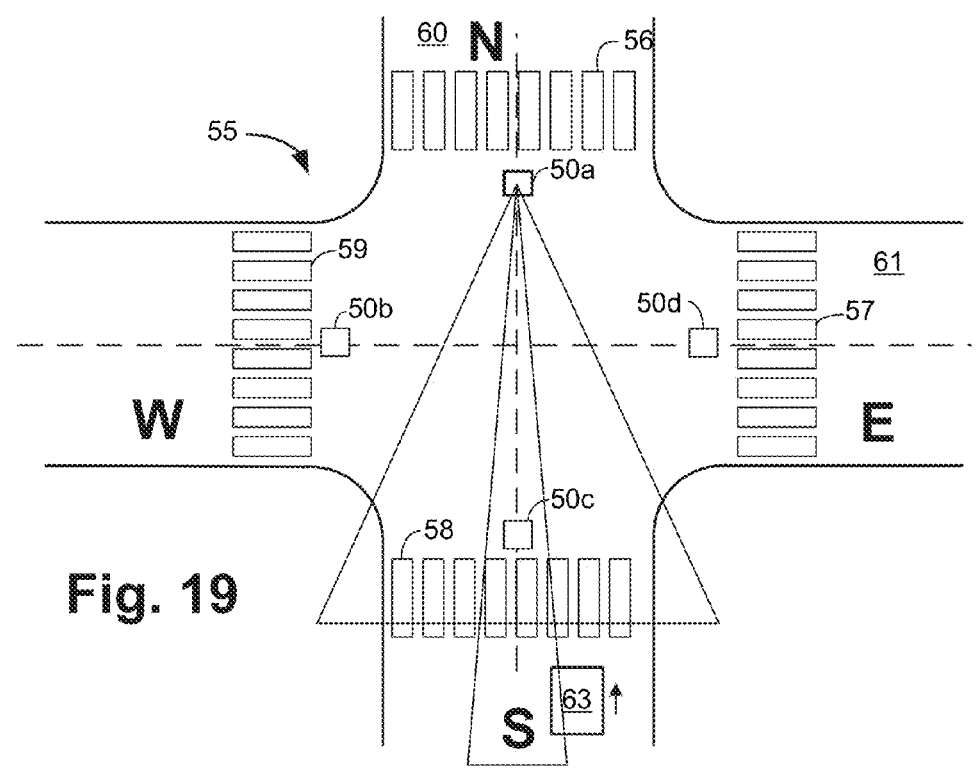
FIG. 19 depicts the system of FIG. 15 observing an intersection, while a northbound vehicle approaches the intersection and prepares to turn left at the intersection.
Figure 20:
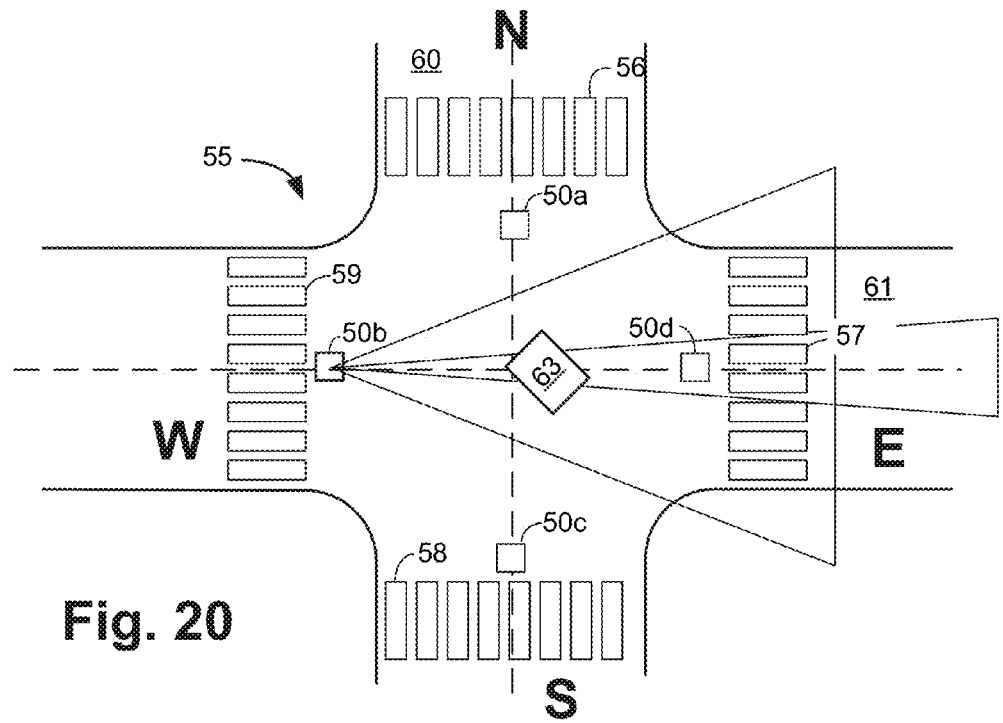
FIG. 20 depicts the system of FIG. 19 as the vehicle is making the left turn.
Figure 21:
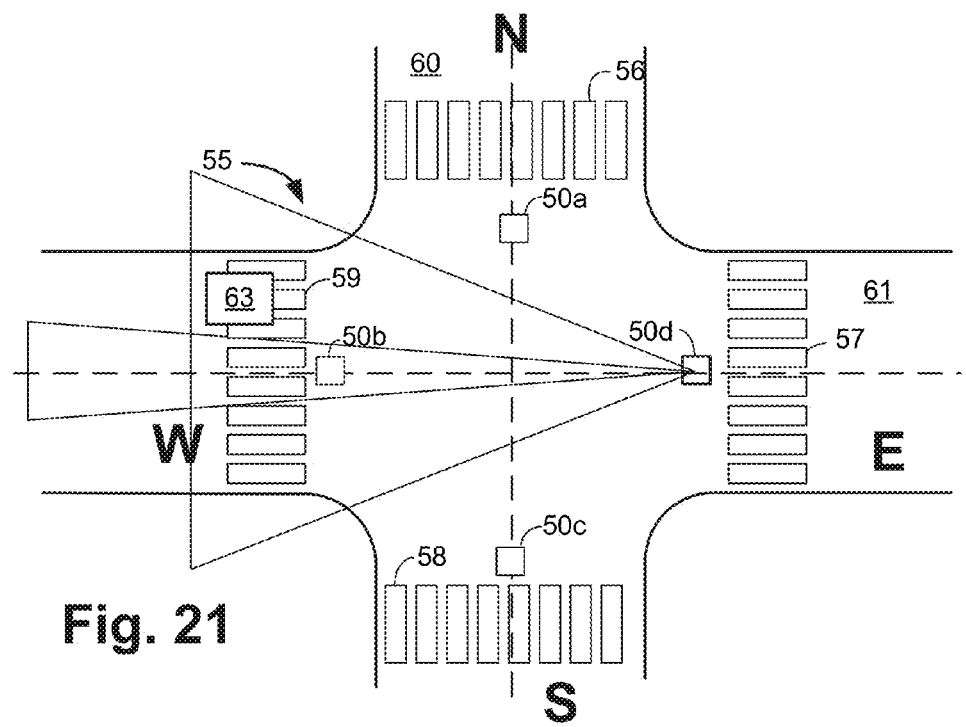
FIG. 21 depicts the system of FIG. 19 as the vehicle continues driving west.

FIGS. 19-21 illustrate an exemplary traffic scenario for a northbound vehicle 63 turning left at the intersection 55. In this scenario, examples of possible violations are:
  a. an illegal stop by the vehicle 63 within the south crosswalk 58; and
  b. an illegal moving within the west crosswalk 58 when a pedestrian is in the crosswalk.

Under the left turn scenario, the vehicle 63 has the right of way to proceed through the south crosswalk 58, but must yield to pedestrians in the west crosswalk 59.

In the scenario illustrated in FIG. 19, the vehicle 63 is driving north on street 60, south of the intersection 55. The vehicle 63 is first detected by the radar device in the north combined sensor 50a, and then by the video imaging sensor in the north combined sensor 50a. The north combined sensor 50a collects and stores a sequence of video and radar frames of the approach of the vehicle 63 and of the vehicle passing through the south crosswalk 58.

FIG. 20 illustrates the vehicle 63 as it turns left in the intersection 55 and is in range of the west combined sensor 50b. A still image of the driver (not shown) is collected by the west combined sensor 50b and stored as raw video data 121 (FIG. 2).

FIG. 21 illustrates the vehicle 63 as it continues driving west through the intersection on street 61. At this point, the vehicle 63 is in range of the east combined sensor 50d, which collects and stores a sequence of video frames of the vehicle 63 passing through the west crosswalk 59, and collects and stores a still image of the vehicle's license plate, as well as the date and time.

In the traffic sequence discussed above with respect to FIGS. 19-21, if the sensor control device 107 (FIG. 1)

detects that the vehicle 63 stopped in the south crosswalk 58 then the data recorded of the vehicle 63 would be tagged as evidence and stored as violation data 180 (FIG. 4). Further, if a proximity violation occurs in the west crosswalk 59 (i.e., the vehicle 63 gets too close to a pedestrian (not shown) in the crosswalk 59), then the data recorded of the vehicle 63 would be tagged as evidence and stored as violation data 180 (FIG. 4). However, if the sensor control device 107 detects that no violation has occurred, the data associated with the vehicle 63 would be discarded.

EXAMPLE 3

Right Turn Scenario Example

Figure 22:
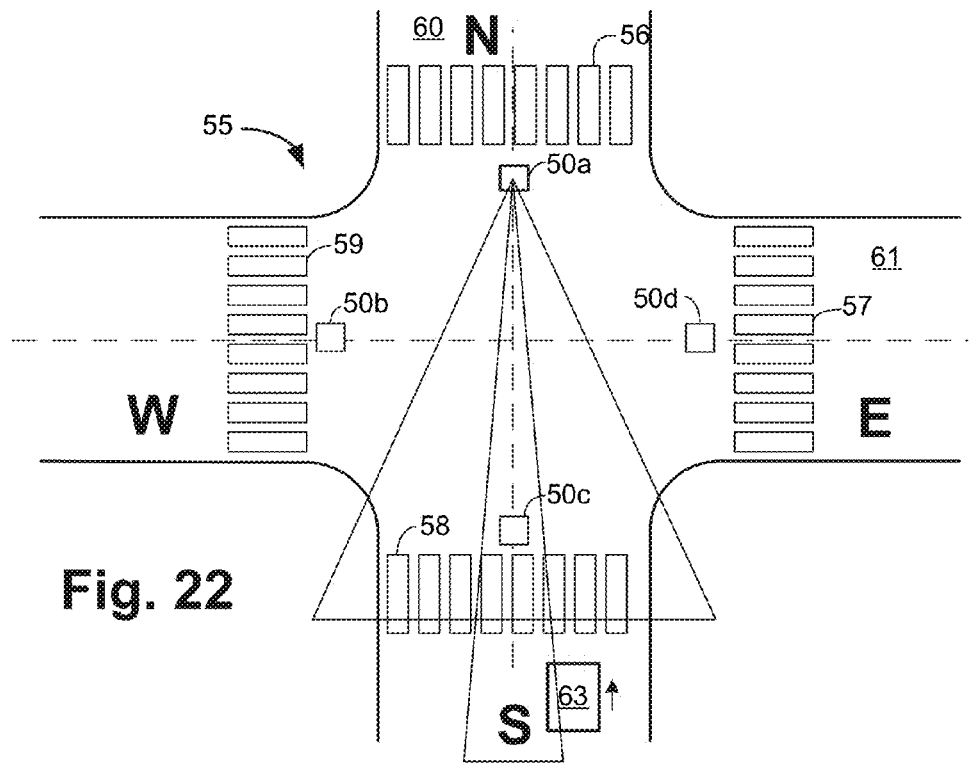
FIG. 22 depicts the system of FIG. 15 observing an intersection, while a northbound vehicle approaches the intersection and prepares to turn right at the intersection
Figure 23:
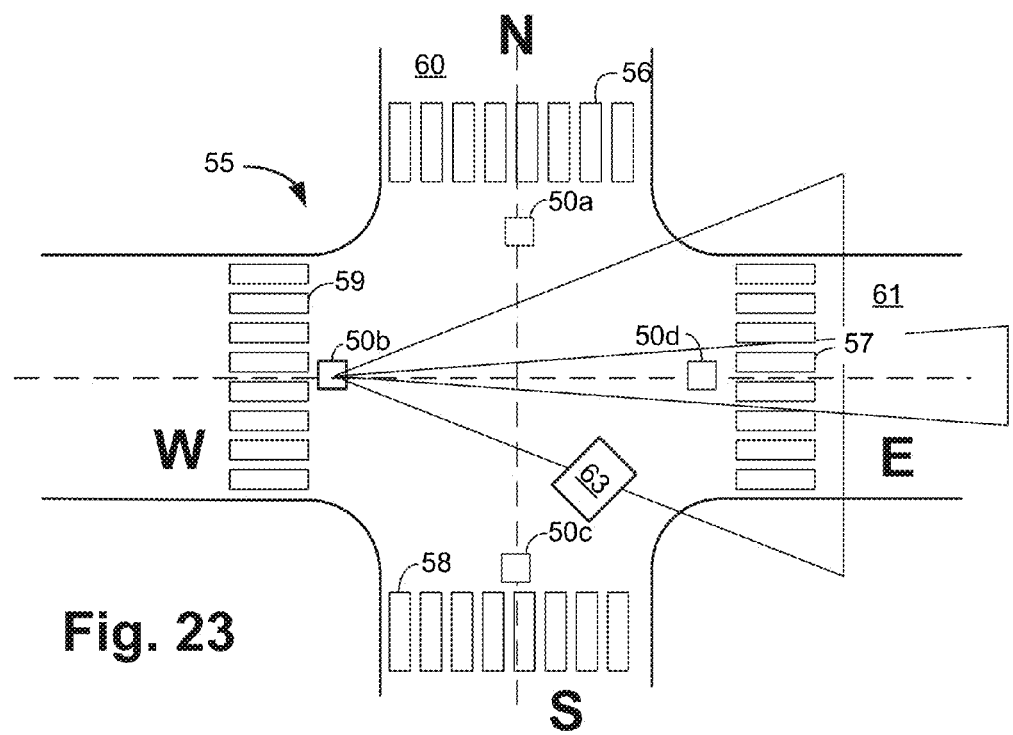
FIG. 23 depicts the system of FIG. 22 as the vehicle is making the right turn.
Figure 24:
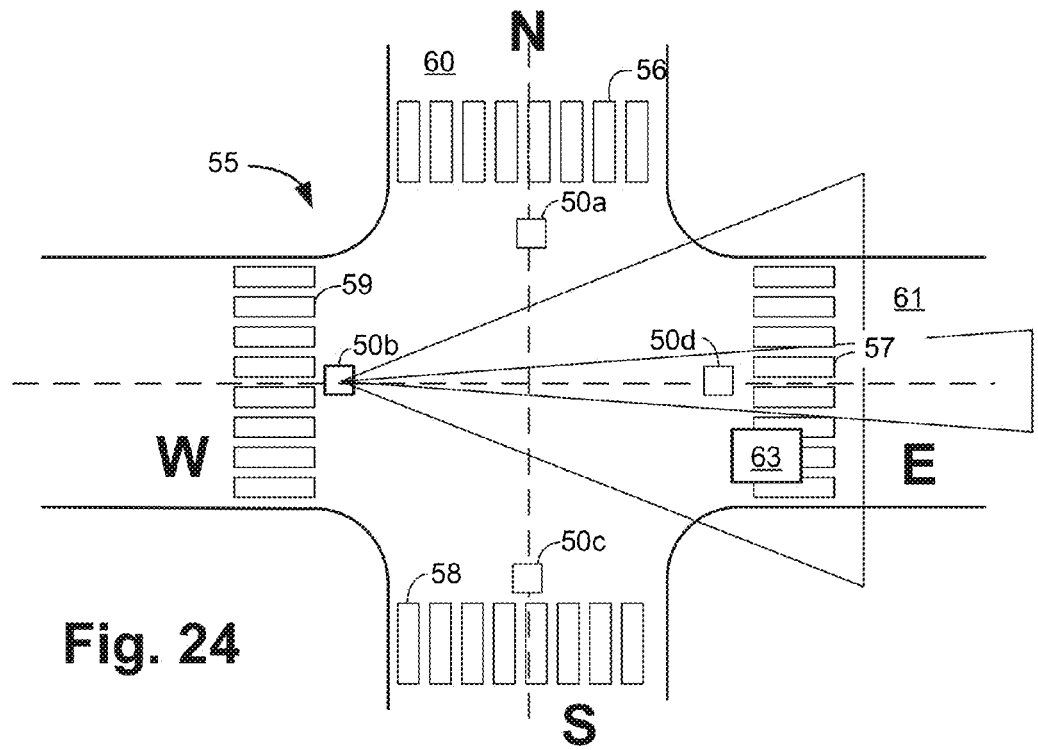
FIG. 24 depicts the system of FIG. 22 as the vehicle continues driving east.

FIGS. 22-24 illustrate an exemplary traffic scenario for a northbound vehicle 63 turning right at the intersection 55. In this scenario, examples of possible violations are:
 a. an illegal stop by the vehicle 63 within the south crosswalk 58; and
 b. illegal moving within the east crosswalk 58 when a pedestrian is in the crosswalk.

Under the right turn scenario, the vehicle 63 has the right of way to proceed through the south crosswalk, but must yield to pedestrians (not shown) in the east crosswalk.

In the scenario illustrated in FIG. 22, the vehicle 63 is driving north on street 60, south of the intersection 55. The vehicle 63 is first detected by the radar device in the north combined sensor 50a, and then by the video imaging sensor in the north combined sensor 50a. The north combined sensor 50a collects and stores a sequence of video and radar frames of the approach of the vehicle 63 and of the vehicle passing through the south crosswalk 58.

FIG. 23 illustrates the vehicle 63 as it turns right in the intersection 55 and is in range of the west combined sensor 50b. A still image of the driver (not shown) is collected by the west combined sensor 50b and stored as raw video data 121 (FIG. 2).

FIG. 24 illustrates the vehicle 63 as it continues driving east through the intersection 55. At this point, the vehicle 63 is still in range of the west combined sensor 50b, which collects and stores a sequence of video frames of the vehicle 63 passing through the east crosswalk 57, and collects and stores a still image of the vehicle's license plate, as well as the date and time.

In the traffic sequence discussed above with respect to FIGS. 22-24, if the sensor control device 107 (FIG. 1) detects that the vehicle 63 stopped in the south crosswalk 58 then the data recorded of the vehicle 63 would be tagged as evidence and stored as violation data 180 (FIG. 4). Further, if a proximity violation occurs in the east crosswalk 57 (i.e., the vehicle 63 gets too close to a pedestrian (not shown) in the crosswalk 57), then the data recorded of the vehicle 63 would be tagged as evidence and stored as violation data 180 (FIG. 4). However, if the sensor control device 107 detects that no violation has occurred, the data associated with the vehicle 63 would be discarded.

EXAMPLE 4

Right Turn on Red Scenario Example

FIGS. 22-24 also can be used to illustrate an exemplary traffic scenario for a northbound vehicle 63 turning right on red at the intersection 55. In this scenario, examples of possible violations are:
 a. illegal moving within the south crosswalk 58 when a pedestrian is in the crosswalk;
 b. an illegal stop by the vehicle 63 within the south crosswalk 58; and
 c. an illegal stop by the vehicle 63 within the east crosswalk 57.

Under the right turn on red scenario, the pedestrian has the right of way to proceed through the south crosswalk 58, and the vehicle 63 must yield to pedestrians, if present. In addition, the vehicle 63 must not stop in the south crosswalk 58 while the pedestrians have the right of way, or in the east crosswalk at the change of traffic signal, thus blocking pedestrian access to that crosswalk.

In the scenario illustrated in FIG. 22, the vehicle 63 is driving north on street 60, south of the intersection 55. The vehicle 63 is first detected by the radar device in the north combined sensor 50a, and then by the video imaging sensor in the north combined sensor 50a. The north combined sensor 50a collects and stores a sequence of video and radar frames of the approach of the vehicle 63 and of the vehicle passing through the south crosswalk 58.

FIG. 23 illustrates the vehicle 63 as it turns right in the intersection 55 and is in range of the west combined sensor 50b. A still image of the driver (not shown) is collected by the west combined sensor 50b and stored as raw video data 121 (FIG. 2).

FIG. 24 illustrates the vehicle 63 as it continues driving east through the intersection 55. At this point, the vehicle 63 is still in range of the west combined sensor 50b, which collects and stores a sequence of video frames of the vehicle 63 passing through the east crosswalk 57, and collects and stores a still image of the vehicle's license plate, as well as the date and time.

In the traffic sequence discussed above with respect to FIGS. 22-24, if the sensor control device 107 (FIG. 1) detects that the vehicle 63 stopped in the south crosswalk 58 then the data recorded of the vehicle 63 would be tagged as evidence and stored as violation data 180 (FIG. 4). Further, if a proximity violation occurs in the east crosswalk 57 or if the vehicle 63 were stopped in the east crosswalk 57 when the traffic signal (not shown) changes, then the data recorded of the vehicle 63 would be tagged as evidence and stored as violation data 180 (FIG. 4). However, if the sensor control device 107 detects that no violation has occurred, the data associated with the vehicle 63 would be discarded.

Figure 25:
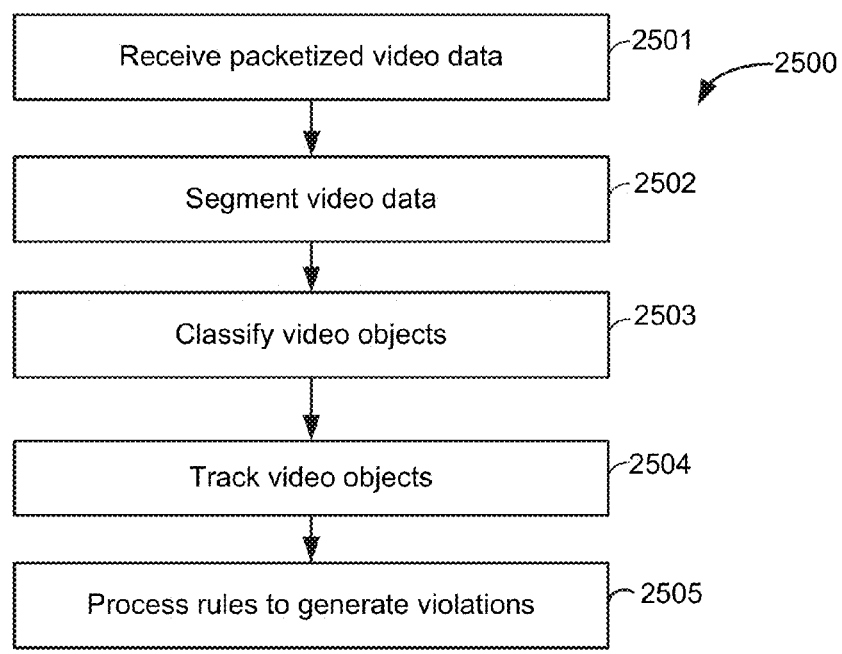
FIG. 25 is a flowchart depicting exemplary architecture and functionality of the rules logic in accordance with an alternate exemplary embodiment of the disclosure in which only one sensor modality is employed in the system.

FIG. 25 is a flowchart depicting exemplary architecture and functionality of the rules logic 174 (FIG. 4) in accordance with an alternate exemplary embodiment of the disclosure. In this embodiment, the system 100 (FIG. 1) does not utilize the radar device 102, and instead of two sensor modalities, relies on video to track vehicles.

In step 2501, the sensor control device 107 (FIG. 1) receives packetized video data 122 (FIG. 2) from the video imaging sensor 101 (FIG. 1).

In step 2502, the sensor control device 107 segments the packetized video data 122 and creates segmented video data 334 (FIG. 4), in the same manner as discussed above with respect to FIGS. 5-8. In step 2503, the sensor control device 107 classifies the segmented video data 334 in a manner similar to that discussed above with respect to FIG. 5.

In step 2504, the segmented video objects are tracked. In this step, a tracking algorithm that is known in the art filters the objects to identify vehicles and pedestrians in the area under observation. The tracking step 2504 is similar to step 508 discussed with respect to FIG. 5 herein.

In step 2505, the rules logic 174 (FIG. 4) executes the process of generating violation data 180 (FIG. 4) by applying the traffic rules to the movement of the vehicles and pedestrians, as discussed above with respect to step 509 of FIG. 5.

This disclosure may be provided in other specific forms and embodiments without departing from the essential characteristics as described herein. The embodiments described are to be considered in all aspects as illustrative only and not restrictive in any manner.

What is claimed is:

1. A system, comprising:
   memory; and
   logic configured to receive and store in the memory radar data and video data indicative of possible pedestrians and vehicles in an area under observation,
   the logic further configured to segment and classify the radar and video data and correlate classified radar objects with classified video objects to identify correlated objects of interest, wherein the logic configured to correlate classified radar objects with classified video objects comprises logic configured to search classified video objects for correlating classified radar objects, record in a matrix a likeness of the modalities for a property, compute a likeness score for each correlated object, and assign a confidence value for each object based upon the likeness score,
   the logic further configured to track the correlated objects to identify tracked pedestrians and vehicles,
   the logic further configured to receive and store in the memory traffic rules data indicative of pedestrian right of way traffic laws for the area under observation,
   the logic further configured to process the tracked pedestrians and vehicles with the traffic rules data to generate and store in the memory data indicative of alleged vehicle pedestrian right of way violations.

2. The system of claim 1, wherein the logic is further configured to receive and store in the memory traffic signal state data indicative of the state of a vehicle traffic signal corresponding to activity of the tracked radar and video objects.

3. The system of claim 2, the traffic signal state data further comprises data indicative of the state of a pedestrian crosswalk signal.

4. The system of claim 1, wherein the area under observation includes one or more pedestrian crosswalks.

5. A method of recording evidence of suspected pedestrian right of way violations by vehicles, the method, comprising:
   receiving raw video data from one or more video cameras collecting video data of an intersection of interest;
   processing the raw video data to form packetized video data;
   spatially segmenting the packetized video data and classifying video objects of interest;
   receiving raw radar data from one or more radar sensors collecting radar data of the intersection of interest;
   spatially segmenting the raw radar data and classifying radar objects of interest;
   correlating the radar and video objects of interest, wherein the correlating step comprises
      searching classified video objects for correlating classified radar objects,
      recording in a matrix a likeness of the modalities for a property,
      computing a likeness score for each correlated object, and
      assigning a confidence value for each object based upon the likeness score;
   tracking the correlated objects of interest;
   receiving traffic rules data indicative of pedestrian right of way traffic laws;
   applying the traffic rules data to the correlated objects of interest and recording alleged violation data.

6. The method of claim 5, further comprising receiving traffic signal state data from a vehicle traffic signal and processing the traffic signal state data with the traffic rules to record alleged violation data.

7. The method of claim 6, wherein the traffic signal state data comprises data indicative of the state of a vehicle traffic signal.

8. The method of claim 7, wherein the traffic signal state data further comprises data indicative of the state of a pedestrian crosswalk signal.

9. A method of recording evidence of suspected pedestrian right of way violations by vehicles, the method, comprising:
   receiving raw video data from one or more video cameras collecting video data of an intersection of interest;
   processing the raw video data to form packetized video data;
   spatially segmenting the packetized video data and classifying video objects of interest;
   receiving raw radar data from one or more radar sensors collecting radar data of the intersection of interest;
   spatially segmenting the raw radar data and classifying radar objects of interest;
   correlating the radar and video objects of interest,
   tracking the correlated objects of interest, wherein the tracking step comprises predicting state vectors for prior known objects, updating state vectors based upon current observed objects, adding state vectors for new objects, and trimming state vectors for stale objects;
   receiving traffic rules data indicative of pedestrian right of way traffic laws;
   applying the traffic rules data to the correlated objects of interest and recording alleged violation data.

10. The method of claim 5, further comprising remotely accessing the alleged violation data and generating traffic citations.

* * * * *